United States Patent Office 3,597,249
Patented Aug. 3, 1971

3,597,249
METHOD OF PRODUCING COMPOSITES OF INORGANIC BINDERS AND FIBERS FROM AQUEOUS SLURRIES
Richard F. Shannon, Lancaster, Ohio, assignor to Owens-Corning Fiberglas Corporation
No Drawing. Filed Aug. 21, 1968, Ser. No. 754,480
Int. Cl. C04b 31/04, 31/08
U.S. Cl. 106—85                13 Claims

ABSTRACT OF THE DISCLOSURE

An improved method of producing fiber reinforced inorganic cementitious composites from aqueous slurries, as for example light weight insulation materials comprising asbestos fibers bonded together by a calcium silicate crystalline binder. The inorganic cementitious material is first grown upon the fibers and the fibers separated leaving the cementitious material bonded to the surface of the fibers. The cement coating fibers are then mixed into another slurry, with or without additional cementitious materials and/or fibers, and the cement coated fibers used for at least a nucleus for growing binder crystals during the hardening of the cementitious materials of the slurry.

BACKGROUND OF THE INVENTION

Numerous types of products can be made which comprise an inorganic cementitious materials reinforced by inorganic fibers and which is hardened out of an aqueous slurry. The raw materials from which the products are made are relatively inexpensive, and one of the major expenses involved in making a formed product of the materials is the cost of the labor required to produce the slurry and shape it into the desired product. One such material is a light weight insulation material of approximaetly 11 pounds per cubic foot density made from a slurry of asbestos fibers and reactive calcareous and siliceous materials. The product is caused to have a light weight by the solidification from a slurry having a high water to solids ratio, usually in excess of 3 to 1, to provide a product wherein the fibers are bonded together by a highly porous inorganic binder structure that is a calcium silicate hydrate having a calcia to silica molal ratio of between 0.8 and 1.0. Different crystalline structures are produced depending upon the calcia to silica ratio and one structure is tobermorite which has the formula $4CaO.5SiO_2.5H_2O$ and another structure is an xonotlite having the structure $5CaO.5SiO_2.1H_2O$. Other types of products are made from aluminates, alumina-silicates, and calcium aluminum silicates, as for example portland cement. Still other types of inorganic crystalline binder structures are made from calcium sulfates as for example gypsum. Still others are made from the phosphates, the oxychlorides, oxysulfates, clays, silicates, as for example those made from silica sols and/or mixtures of silica sols and clays, etc.

One of the difficulties that is involved in producing slurries of high water to solids ratio, of any of the inorganic binders including those enumerated above, is that the solids tend to separate out to give a nonuniform product. In some instances a product is formed having more binder at the bottom than at the top, and in other instances large holes or voids are formed therein. The nonuniform binder is difficult to mold and does not produce sharp corners in the molded product. In many instances the continual mixing necessary to prevent solid separation is destructive to the crystalline structure that is grown during the slurry holding operation prior to molding. This mixing tends to break the binder away from the fibers so that the binder grows as crystals unattached to the fibers, at least in the early stages of crystalline growth. The continuous mixing and the difficulty of molding prior art slurries, necessitates the use of a large amount of labor and causes the labor to be a high percentage of the total production cost of the product.

An object of the invention is the provision of a new and improved method of making a fiber-inorganic crystalline binder composite having better bond to the fibers.

Another object of the present invention is the provision of a new and improved process for producing slurries of fibers and inorganic binders having greatly reduced tendency of the solids to settle out of the slurry.

Another object of the invention is the provision of a new and improved method of producing a slurry of fibers and an inorganic binder which is creamier and more handleable than prior art mixes, and which can be molded more easily, and will produce a more uniform and stronger product having sharper features.

A further object of the invention is the provision of a new and improved process of producing a light weight fiber-inorganic binder composite wherein one type of crystalline structure is grown on the fibers, and the fibers are grouped together and autoclaved to change the crystalline structure and reunite the fibers.

SUMMARY

According to the invention, a new and improved process for producing composites of inorganic fibers and inorganic crystalline binders is provided wherein hardened binder is attached to the fiber, a slurry of these binder coated fibers is made, and a hardened product formed by uniting the hardened binder coating already on the fibers. The uniting of the hardened binder coating may in some instances be done by bringing the coated fibers into contact and then changing the crystalline structure of the binder as by autoclaving. By this procedure, sufficient driving force is provided to not only modify the crystalline structure of the hardened binder coating but at the same time link up the coating with that on other fibers. In other instances the hardened binder coating serves only as a nucleous for crystalline growth which bonds to the coating on adjacent fibers. Not only is less time required for the hardening of the finished product, but slurries made from the binder coated fibers retain water better and are creamier than are slurries of untreated fibers and binder. The slurries of the invention are more uniform and creamy, and the products produced are more uniform and have sharper detail and greater strength.

Description of the Preferred Embodiments.—Example 1

The present procedure describes the production of a light weight thermal insulation material having a density of approximately 11 pounds per cubic foot, and a binder crystalline structure that is primarily tobermorite having the formula $4CaO.5SiO_2.5H_2O$.

| Ingredients: | Parts by wt. |
|---|---|
| Amosite asbestos | 400 |
| Chrysotile asbestos | 100 |
| Quicklime | 760 |
| Supersil (95% 325 mesh silica) Pennsylvania Glass Sand Co. | 400 |
| Clay | 100 |
| Celatom (diatomaceous earth) Eagle-Picher Co. | 650 |
| Limestone | 735 |
| Total | 3145 |

In the above materials the quicklime is .94 active calcia, the celatom is 0.83 active silica, and the clay 0.45 active silica, to give a calcia to silica molar ratio of 0.794. A slurry of 6 to 1 water to solids ratio was prepared and kept agitated in a Hydropulper for approximately ¼ hour, and was then poured into molds to provide one inch block. The molds were placed in an autoclave whose pressure was raised to 175 pounds per square inch gauge over a period of 1 hour with saturated steam. Thereafter the autoclave was held at this pressure for two hours, following which the temperature of the autoclave was raised to 550° F. by circulating Dowtherm through heating coils within the autoclave. This temperature was held an additional two hours during which superheated steam was vented from the autoclave, and following which the autoclave was depressurized over a period of 1 hour. A product was produced whose binder was approximately 80% tobermorite.

The product so produced was then placed in a Jeffery hammermill run at 900 r.p.m. and fitted with a ½ inch screen. The action of the hammers cracks the crystalline binder without materially subdividing the fibers to leave a high percentage of the binder as a coating on the fibers.

The following table indicates the fiber length as determined by the Bauer McNett fiber classifier testing procedure for the coated fibers as well as the asbestos used initially.

| Material | Percent retained on— | | | | |
|---|---|---|---|---|---|
| | 4 mesh | 14 mesh | 35 mesh | 100 mesh | 200 mesh |
| Amosite | 62.7 | 14.1 | 8.2 | 11.7 | 3.3 |
| Chrysotile | 4 | 13 | 23 | 36 | 45 |
| Hammermilled product | 21 | 25.4 | 22.5 | | 23.4 |

It will be seen from the above analysis that while some of the longer fibers are broken, the intermediate length fibers of the 14 and 35 mesh are retained.

The fibers produced as above described were then used to produce another slurry of the following composition.

Ingredients: Parts by wt.
- Amosite _____ 400
- Chrysotile _____ 100
- Quicklime _____ 740
- Supersil _____ 400
- Celatom _____ 650
- Clay _____ 100
- Binder coated fibers _____ 700
- Total _____ 3090

A slurry was made using a 6 to 1 water to solids ratio, and the slurry was then cast into one and a half inch thick blocks and autoclaved using the cycle described above, to produce a product having a modulus of rupture of 60+ and a crystalline structure which was more than 80% tobermorite. The second slurry made by using the binder coated fibers was much creamier in consistency, and had less tendency for solid separation than did the first formed slurry. The molded product had sharper corners, and approximately a 50% better strength than did the first formed material.

EXAMPLE 2

A material having a xonotlite crystalline structure was made from the following ingredients.

Ingredients: Parts by wt.
- Amosite _____ 300
- Chrysotile _____ 200
- Quicklime _____ 750
- Supersil _____ 780
- Red oxide _____ 11
- Limestone _____ 165
- Total _____ 2206

This material had an active CaO to SiO ratio of 0.953 and 10,395 parts by weight of water was used. The molds were placed in an autoclave whose pressure was raised to 175 p.s.i. over a 1 hour period. The autoclave was held at this pressure for 4 hours following which the temperature was raised to 550° F. by circulating Dowtherm through heating coils. The temperature was held an additional 4 hours during which superheated steam was vented from the autoclave and following which it was depressurized over a 1 hour period. The product was then passed through the hammermill of Example 1. The water to solids ratio was 4.71. The crystalline structure produced was more than 80% of xonotlite.

The binder coated fibers were then incorporated into a slurry of the following composition.

Ingredients: Parts by wt.
- Amosite _____ 300
- Chrysotile _____ 200
- Quicklime _____ 750
- Supersil _____ 780
- Binder coated fibers _____ 700

This material has an active calcia to silica ratio of 1.017 and when mixed with water to provide a water to solids ration of 4.7 has much less tendency for solid separation, is creamier and easier to mold, and has greater strength than the first formed product. In the above examples, the binder coated fibers are used as a nucleus for growing additional binder of substantially the same crystalline structure. It is not necessary to grow the same crystalline structure, however, and xonotlite can be grown over tobermorite and vice versa by using additional binder material of the appropriate calcia to silica ratio. It is also possible to form a product of the binder coated fibers without additional binder by autoclaving the binder coated fibers.

EXAMPLE 3

The tobermorite coated fibers produced as in Example 1 were wetted with water without additional binder forming materials, and were autoclaved using the same cycle given above. A hard product was formed having a density of 20 pounds per cubic foot and a modulus of rupture of 60 with over 80% of the binder being tobermorite.

EXAMPLE 4

The process of Example 3 was repeated using the xonotlite coated fibers of Example 2 to produce a bonded product similar to that produced in Example 3 excepting that the structure was more than 80% xonotlite.

EXAMPLE 5

One hundred parts by weight of the binder coated fibers of Example 2 are mixed with a hundred parts of an aluminous cement, purchased under the trade name of Lumnite. The fibers are dampened with approximately 200 parts of water and compacted into a mold and allowed to air dry for two days. A material having a density of approximately 30 pounds per cubic foot is formed which has a greater strength than the material of Example 2 indicating that a good bond between the aluminous cement and the coated fibers is obtained.

EXAMPLE 6

A slurry containing 30% magnesium oxide, 15% $MgSO_4 \cdot 7H_2O$ and the balance water is prepared. A hundred parts of Refrasil [1] glass fibers approximately ½ inch long are tumbled with the above slurry and the material poured into a mold and allowed to air dry for 24 hours. The material is then put through the Jeffery Hammermill, described in Example 1, run at 900 r.p.m. and using a half inch screen. The binder coated glass fibers produced are then used in place of the binder coated fibers of Example 2 and are processed in the same manner, to produce a xonotlite bonded product. The magnesium oxysulfate coated glass fibers act in the same manner as the coated asbestos in that they give a premix having little solid separation tendency and produce a product having sharp detail and high strength. Alternatively the magnesium oxysulfate forming slurry can be used to bond the coated fibers of Examples 1 and 2 above.

---

[1] Refrasil are acid leached glass fibers of a high $SiO_2$ purity of more than apnriximately 98%.

EXAMPLE 7

A slurry is made using 30 parts of monoammonium phosphate, 90 parts of a silica sol and 22 parts of water. The process of Example 6 is repeated using the phosphate forming slurry in place of the magnesium oxysulfate forming slurry with substantially the same beneficial results. Alternatively the slurry can be used to bond the coated fibers of Examples 1 and 2 above. Other silica-phosphate binders are disclosed in U.S. Pat. 2,479,504.

EXAMPLE 8

A hundred parts of mineral wool fibers are chopped into approximately one half inch lengths and tumbled with 100 parts of Lumnite cement and 300 parts by weight of water. The mixture is cast into a block one inch thick and allowed to harden for 24 hours, and is then put through the hammermill as above described. One hundred fifty parts of the hammermilled material is then mixed into a slurry using 50 parts of the Lumnite cement and 300 parts of water. The slurry has a much creamier consistency than a similar material made with uncoated mineral wool fibers, and gives a stronger product, when hardened under atmospheric conditions for 6 days.

EXAMPLE 9

A slurry having a water to solids ratio of 4 to 1 is made using 100 pounds of portland cement and 100 parts of the amosite asbestos given above. The material is cast into one inch thick blocks and hardened for 24 hours at atmospheric pressure in a steam filled room at approximately 200° F. and dried. The material is put through the Jeffery hammermill described above to produce portland cement coated asbestos fibers. A slurry made from these fibers using parts of Celatom and sufficient water to provide a water to solids ratio of 4.93 has the characteristics of that given in Example 1 above. When autoclaved in the same manner as given in Example 1, the product has substantially the same strength given in Example 1 above.

When making a calcium silicate binder, it is usually preferable to use a CaO to SiO ratio of between 0.70 and 1.20. It will be understood that the calcia to silica ratios ranging from approximately .7 to approximately .85 will produce a predominantly tobermorite structure, whereas a CaO and SiO ratio of approximately .95 to 1.2 will produce a xonotlite structure.

It will also be apparent that a slurry having improved properties will be produced when the solids in the slurry comprise from approximately 10 to 100 parts by weight of the inorganic binder coated fibers, and that the binder coated fibers can be bonded together with or without the addition of further binder. The additional binder, therefore, may comprise from 0 to approximately 90%, and additional fillers and fibers can be used in amounts of 0 to approximately 60% of the slurry solids. The density of the finished product will of course vary with the water to solids ratio of the slurry, and where a dense product is desired, only a slight excess over that necessary to supply the water of crystallation will be used. Where a light weight material is desired, i.e. one less than 25 pounds per cubic foot, it will usually be desired to use a water to solids ratio of more than 3 to 1 and as much as approximately 10 to 1. A most preferred product having a density of approximately 12 pounds per cubic foot is obtained using a ratio of approximately 6 to 1.

EXAMPLE 10

A slurry was made of the following composition.

| Ingredients: | Parts by wt. |
|---|---|
| Diatomaceous earth | 500 |
| Quicklime | 355 |
| Chrysotile | 100 |
| Hammermilled fibers of Example 1 | 100 |
| Water | 20000 |

The slurry was passed through a filter press which retained the solids in the shape of pipe insulation 1 inch thick. The solids were then autoclaved as in Example 1 to produce a product having the same advantages as in Example 1.

EXAMPLE 11

The process of Example 10 is repeated using a slurry of the following composition.

| Ingredients: | Parts by wt. |
|---|---|
| Quicklime | 275 |
| Portland cement | 150 |
| Diatomaceous earth | 465 |
| Chrysotile | 100 |
| Hammermilled fibers of Example 1 | 100 |
| Water | 20000 |

A product equally as good as in Example 10 is produced.

While the invention has been described in considerable detail, I do not wish to be limited to the particular embodiments shown and described, and it is my intention to cover hereby all novel adaptations, modifications, and arrangements thereof which come within the practice of those skilled in the art to which the invention relates.

What is claimed is:

1. The method of producing an inorganic fiber reinforced inorganic cementitious crystalline binder material comprising: preparing a mixture of an inorganic cementitious crystalline binder forming material and inorganic fibers, causing said binder to bond to and crystallize about said inorganic fibers, subdividing said mixture in a hammermill to pass through a ½ inch screen by cracking the crystalline binder without materially subdividing the fibers and leaving a high percentage of the binder as a coating on the fibers, preparing an aqueous slurry comprising said subdivided mixture, and causing the crystalline structure of the binder material to grow between said fibers.

2. The method of claim 1 wherein said binder forming material produces a hydrate, and said bonding step is performed by autoclaving.

3. The method of claim 2 wherein said second preparing step comprises: mixing from approximately 10 to approximately 100% by weight of solids of the fibers having hardened binder thereon, from 0 to approximately 60% of fillers and fibers not coated with calcia-silicate forming materials.

4. The method of claim 2 wherein the fibers are asbestos fibers.

5. The method of claim 3 wherein said binder forming material comprises portland cement.

6. The method of claim 1 comprising: preparing an aqueous slurry having a water to solids weight ratio of at least 3, and in which the solids comprise asbestos fibers and reactive calcareous and reactive siliceous materials in a ratio to provide a CaO to $SiO_2$ molal ratio of between 0.70 and 1.2; autoclaving the slurry to unite the asbestos fibers by a hardened calcium silicate binder, fracturing the binder to form particles to pass through a ½ inch screen and be retained on a 200 standard mesh screen leaving crystals of the binder on the asbestos, preparing an aqueous slurry comprising said asbestos having the crystals thereon, and autoclaving the slurry to grow crystals of calcium silicate between crystals already on the fibers to produce a bonded product.

7. The method of claim 6 wherein the solids of the second mentioned slurry comprises: from approximately 10% to approximately 90% of the fractured products, from 0% to approximately 60% of additional fibers and fillers, and from 0 to approximately 90% of additional calcareous and silicious materials having an active CaO to $SiO_2$ molal ratio of between 0.7 and 1.2.

8. The process of claim 1 wherein the first prepared mixture is primarily a portland cement slurry hardened at atmospheric pressure.

9. The process of claim 8 wherein the second prepared slurry comprises the portland cement coated fibers and sufficient reactive silica to give a calcia to silica molal ratio inclusive of the portland cement coating between 0.7 and 1.2, and wherein the bonding step is performed in an autoclave.

10. The process of claim 1 wherein the fibers are glass and the inorganic binder is a magnesium oxysulfate.

11. The method of claim 1 wherein the fibers are glass and the inorganic binder is a silica-phosphate.

12. The method of claim 1 wherein the coated fibers are bonded together using an aluminous cement.

13. The method of claim 12 wherein the fibers are high purity silica fibers.

References Cited
UNITED STATES PATENTS

| | | | |
|---|---|---|---|
| 3,472,668 | 10/1969 | Pfeifer et al. | 106—99 |
| 3,257,220 | 6/1966 | Kalousek et al. | 106—120 |
| 3,100,156 | 8/1963 | Kalousek et al. | 106—120 |
| 2,793,130 | 5/1957 | Shannon et al. | 106—99 |
| 2,748,008 | 5/1956 | Kalousek | 106—120 |
| 2,623,828 | 12/1952 | Dove | 106—99 |
| 2,568,023 | 9/1951 | Perry | 106—99 |
| 2,547,127 | 4/1951 | Kalousek | 106—120 |
| 1,580,787 | 4/1926 | Lanhoffer et al. | 106—99 |

TOBIAS E. LEVOW, Primary Examiner

W. T. SCOTT, Assistant Examiner

U.S. Cl. X.R.

106—50, 52, 84, 89, 99, 104, 105, 110, 120, 308B